US 7,494,229 B2

(12) United States Patent
Miyasaka

(10) Patent No.: US 7,494,229 B2
(45) Date of Patent: Feb. 24, 2009

(54) PROJECTOR AND PROCESSING LINE SPECIFICATION METHOD

(75) Inventor: Noriaki Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 548 days.

(21) Appl. No.: 11/357,261

(22) Filed: Feb. 21, 2006

(65) Prior Publication Data
US 2006/0187184 A1    Aug. 24, 2006

(30) Foreign Application Priority Data
Feb. 22, 2005    (JP)    ............................. 2005-045682

(51) Int. Cl.
G03B 21/00    (2006.01)
G03B 21/14    (2006.01)
G03B 3/00    (2006.01)

(52) U.S. Cl. ........................... 353/101; 353/69; 353/70; 353/100; 353/121; 345/214

(58) Field of Classification Search .................. 353/69, 353/70, 100, 101, 121; 345/214
See application file for complete search history.

(56) References Cited

U.S. PATENT DOCUMENTS

| 7,014,323 | B2* | 3/2006 | Kobayashi et al. | ............ 353/69 |
| 2005/0062939 | A1* | 3/2005 | Tamura | ........................ 353/69 |
| 2007/0091277 | A1* | 4/2007 | Damera-Venkata et al. | ... 353/69 |
| 2008/0036976 | A1* | 2/2008 | Han | ............................. 353/69 |
| 2008/0062164 | A1* | 3/2008 | Bassi et al. | .................. 345/214 |

FOREIGN PATENT DOCUMENTS

JP    A 2004-312690    11/2004

* cited by examiner

Primary Examiner—William C Dowling
Assistant Examiner—Danell L Owens
(74) Attorney, Agent, or Firm—Oliff & Berridge, PLC

(57) ABSTRACT

A projector of the invention includes: a projection lens that is movable in a direction substantially perpendicular to an optical axis to project and display an image on a projection object; an imaging structure that photographs an area including at least the projected image on the projection object to take a photographed image; a shift level detection unit that detects a shift level of the projection lens; a control module that specifies a reference line to be processed in the photographed image; and a storage unit that stores a map of positional information to each shift level, where the positional information represents an expected relative line position to the projected image included in the photographed image. The control module specifies a display position of the projected image included in the photographed image, reads the positional information corresponding to the shift level detected by the shift level detection unit from the map stored in the storage unit, and specifies the reference line, based on the expected relative line position represented by the read positional information and the specified display position of the projected image. Even under the condition of a shift of the projection lens, the projector of this arrangement distinctly identifies the position of maximum brightness in the photographed image and thereby ensures accurate and adequate keystone correction and other required image processing operations.

6 Claims, 6 Drawing Sheets

Fig.3

(Relative Peak Position Table)

| Shift Level | Relative Peak Position |
|---:|---:|
| -100 | 100 |
| -90 | 95 |
| -80 | 90 |
| -70 | 85 |
| -60 | 80 |
| -50 | 75 |
| -40 | 70 |
| -30 | 65 |
| -20 | 60 |
| -10 | 55 |
| 0 | 50 |
| 10 | 45 |
| 20 | 40 |
| 30 | 35 |
| 40 | 30 |
| 50 | 25 |
| 60 | 20 |
| 70 | 15 |
| 80 | 10 |
| 90 | 5 |
| 100 | 0 |

(h2/H = 0.1)

PROJECTOR AND PROCESSING LINE SPECIFICATION METHOD

BACKGROUND OF THE INVENTION

1. Field of the Invention

The present invention relates to a projector that is equipped with a shift projection lens and an imaging unit and functions to project an image on a screen or another projection object and photograph the projected image with the imaging unit.

2. Description of the Related Art

Various projectors equipped with an imaging unit including a CCD (Charge Coupled Device) camera have been proposed to photograph a selected image projected on a screen or another projection object with the imaging unit and to adjust the zoom and the focus and correct a trapezoidal distortion of the projected image (keystone correction) based on the photographed image.

One of such projectors is disclosed in Japanese Patent Laid-Open Gazette No. 2004-312690. This prior art projector analyzes a photographed image, identifies the position of maximum brightness in the photographed image, and makes keystone correction according to the identified position of maximum brightness.

The projector making keystone correction based on the identified position of maximum brightness may have a projection lens that is movable in a direction substantially perpendicular to the optical axis (hereafter called 'shift lens'). Even when the projector is set at a position other than in front of the projection object (for example, below the projection object) not to block the user's view, a positional shift of the shift lens enables projection of an image at a desired position on the projection object.

In the projector equipped with the shift lens, the position of maximum brightness in the photographed image is required for keystone correction or other image processing operations. One typical method identifies the position of maximum brightness in the photographed image, based on pixel values of pixels on a specified reference line included in the photographed image. This conventional method, however, has some drawbacks due to the specification of the reference line. In the description below, the brightness is expressed by the pixel value.

FIGS. 5(A) through 5(C) show a projection state of a conventional projector PJ without a lens shift, a photographed image taken in this projection state, and a luminance distribution of the photographed image.

The side view of FIG. 5(A) shows a certain projection state of the conventional projector PJ, FIG. 5(B) shows a photographed image taken in the projection state of FIG. 5(A), and the graph of FIG. 5(C) shows a distribution of luminance values of respective pixels on a horizontal line L1 in the photographed image of FIG. 5(B). The horizontal line L1 passes through an intersection between an optical axis of an optical system in the projector PJ and a screen Sc (hereafter this intersection is referred to as the 'optical axis point').

As shown in FIG. 5(A), the conventional projector PJ has a shift lens 10 and an imaging structure CA including a CCD camera. In the projection state of FIG. 5(A), the shift lens 10 has no shift.

In the projection state of FIG. 5(A), the projector PJ is inclined to the screen Sc to have an elevation angle. In this state of elevation projection, the projected image has a trapezoidal distortion.

The projector PJ projects an adjustment pattern image G for keystone correction on the screen Sc and photographs an image including the projected adjustment pattern image G with the imaging structure CA. The subsequent keystone correction is made, based on the identified position of maximum luminance in the photographed image.

The imaging structure CA of the projector PJ is arranged to locate the projected adjustment pattern image G on the center of the photographed image in the projection state without a lens shift shown in FIG. 5(A). Namely the projected adjustment pattern image G is located on the center of the photographed image as shown in FIG. 5(B).

In this projection state without a lens shift, the distribution of luminance values of respective pixels on the horizontal line L1 passing through the optical axis point P has a distinct peak with its maximum at the optical axis point P as shown in FIG. 5(C). The shorter distance between the screen Sc and the projector PJ in the coverage of the projection light of the projector PJ causes the higher luminance in the photographed image. Since the projector PJ has no inclination in the horizontal direction in the state of FIG. 5(A), the luminance distribution on the horizontal line L1 has a peak at the position of the optical axis point P.

The projector PJ compares the luminance values of the respective pixels on the horizontal line L1 and identifies the position of maximum luminance as a peak position in the photographed image.

A specified horizontal line referred to for identification of the peak position in the photographed image, for example, the horizontal line L1, is hereafter referred to as the 'peak position reference line'.

The conventional procedure sets a certain rate h1/H of a height 'h1' of the optical axis point P to a height H of the projected adjustment pattern image G in the projection state of FIG. 5(A), and specifies a horizontal line having the height of the certain rate h1/H to the height of a projected image as the peak position reference line.

In order to prevent the projector PJ from blocking the user's view, the user shifts the shift lens 10 upward and moves the position of the projected image further upward.

FIGS. 6(A) through 6(C) show a projection state of the conventional projector PJ with a lens shift, a photographed image taken in this projection state, and a luminance distribution of the photographed image.

The side view of FIG. 6(A) shows a certain projection state of the conventional projector PJ, FIG. 6(B) shows a photographed image taken in the projection state of FIG. 6(A), and the graph of FIG. 6(C) shows a distribution of luminance values of respective pixels on a peak position reference line in the photographed image of FIG. 6(B). The position and the projection area of the shift lens 10 shown by the solid line in FIG. 5(A) are shown by the broken line in FIG. 6(A). In FIG. 6, the same symbols as those of FIG. 5 have the same meanings and are not specifically described here.

An upward shift of the shift lens 10 causes the projector PJ to project the adjustment pattern image G at the upper position on the screen Sc as shown in FIG. 6(A). The projected adjustment pattern image G included in the photographed image of FIG. 6(B) accordingly has a further upward positional shift from the projected adjustment pattern image G in the photographed image of FIG. 5(B). The lens shift causes a trapezoidal distortion of the projected adjustment pattern image G included in the photographed image.

The lens shift does not change the position of the optical axis point P on the screen Sc as shown in FIG. 6(A), so that the relative position of the optical axis point P in the photographed image of FIG. 6(B) is not changed but is fixed. The relative position of the optical axis point P to the projected adjustment pattern image G (hereafter referred to as the 'relative peak position') in the photographed image of FIG. 6(B)

thus moves downward from the relative peak position in the photographed image of FIG. 5(B).

In the photographed image of FIG. 6(B), the peak position reference line having the height of the certain rate h1/H (see FIG. 5(B)) is a horizontal line L2 having a height h1 from the bottom side of the projected adjustment pattern image G. A point Q in the photographed image of FIG. 6(B) represents a center point of the horizontal line L2.

The relative peak position moves downward as mentioned above, so that the horizontal line L2 or the peak position reference line does not pass through the optical axis point P.

The distribution of luminance values of respective pixels on the horizontal line L2 as the peak position reference line in this projection state has a gentler peak with a relatively indistinct peak position as shown in FIG. 6(C), compared with the luminance distribution of FIG. 5(C).

The distance between the projector PJ and the center point Q is longer than the distance between the projector PJ and the optical axis point P as shown in FIG. 6(A). The luminance value of the center point Q (corresponding to the peak position of the horizontal line L2) is accordingly lower than the luminance value of the optical axis point P (corresponding to the peak position of the horizontal line L1 shown in FIG. 5(B)).

As described above, the lens shift in the prior art projector may give only an indistinct peak position or maximum luminance position in the photographed image. This may result in inaccurate identification of the peak position in the photographed image and accordingly inadequate and inaccurate keystone correction and other image processing operations.

SUMMARY OF THE INVENTION

In a projector that is equipped with an imaging structure and a movable projection lens and photographs a projected image on a screen or another projection object with the imaging structure, the object of the invention is to eliminate the drawbacks of the prior art technique and to provide a technique of distinctly and accurately identifies the position of maximum brightness in the photographed image even under the condition of a shift of the projection lens.

In order to attain at least part of the above and the other related objects, the present invention is directed to a projector that is equipped with a projection lens movable in a direction substantially perpendicular to an optical axis and uses the projection lens to project and display an image on a projection object. The projector includes: an imaging structure that photographs an area including at least the projected image on the projection object to take a photographed image; a shift level detection unit that detects a shift level of the projection lens; a control module that specifies a reference line to be processed in the photographed image; and a storage unit that stores a map of positional information to each shift level, where the positional information represents an expected relative line position to the projected image included in the photographed image.

The control module specifies a display position of the projected image included in the photographed image. The control module controls the shift level detection unit to detect the shift level, reads the positional information corresponding to the detected shift level from the map stored in the storage unit, and specifies the reference line, based on the expected relative line position represented by the read positional information and the specified display position of the projected image.

The storage unit stores the map of the positional information, which represents the expected relative line position, to each shift level. The control module controls the shift level detection unit to detect the shift level of the projection lens and reads the positional information corresponding to the detected shift level from the map stored in the storage unit. The expected relative line position represents the relative line position to the projected image included in the photographed image. The control module specifies the line at the expected relative line position as the reference line to be processed, based on the specified display position of the projected image included in the photographed image and the expected relative line position represented by the read positional information.

Storage of the positional information representing a desired relative line position corresponding to each shift level in the storage unit enables a desired line to be specified as the reference line even under the condition of a shift of the projection lens.

In one preferable embodiment of the invention, the control module identifies a position of maximum brightness on the specified reference line as an image peak position having maximum brightness in the photographed image. The projector of this embodiment further has an image processing unit that adjusts the projected image, based on the image peak position identified by the control module.

The projector of this embodiment experimentally or otherwise determines a line passing through a position of maximum brightness in the photographed image corresponding to each detected shift level of the projection lens and stores a mapping of the positional information of the determined line to the shift level in the storage unit. Even under the condition of a shift of the projection lens, the control module specifies the line passing through the position of maximum brightness as the reference line corresponding to the detected shift level of the projection lens and thus accurately identifies the position of maximum brightness in the photographed image.

In the projector of this embodiment, the image processing unit adjusts the projected image, based on the image peak position identified by the control module. This arrangement enables adequate adjustment of the projected image based on the accurately identified image peak position, even under the condition of a shift of the projection lens.

In one preferable application of the projector of this embodiment, the image processing unit adjusts the projected image on the projection object to correct a distortion of the projected image caused by an inclination of the projector to the projection object.

Even in an inclined attitude of the projector to the projection object, the projector of this arrangement adjusts the projected image to correct a distortion of the projected image caused by the inclination of the projector, based on the accurately identified image peak position. Correction values for correcting the distortion of the projected image may be determined corresponding to the image peak position. This arrangement enables the distortion of the projected image to be corrected with the adequate correction values determined corresponding to the accurately identified image peak position. The projected image is thus adjustable to have significantly little distortion.

In the projector of the invention, the expected relative line position may represent position of a line passing through an intersection between the optical axis of the projector and the projection object.

The intersection between the optical axis of the projector and the projection object may have the maximum brightness in the photographed image. In such cases, the above arrangement enables the control module to readily specify the line passing through the position of maximum brightness as the reference line.

The technique of the invention is not restricted to the projector having any of the above arrangements but is also actualized by a corresponding processing line specification method.

BRIEF DESCRIPTION OF THE DRAWINGS

FIG. 3 shows a relative peak position table stored in a relative peal position table storage unit included in the projector of the embodiment;

DESCRIPTION OF THE PREFERRED EMBODIMENTS

Figure 1:
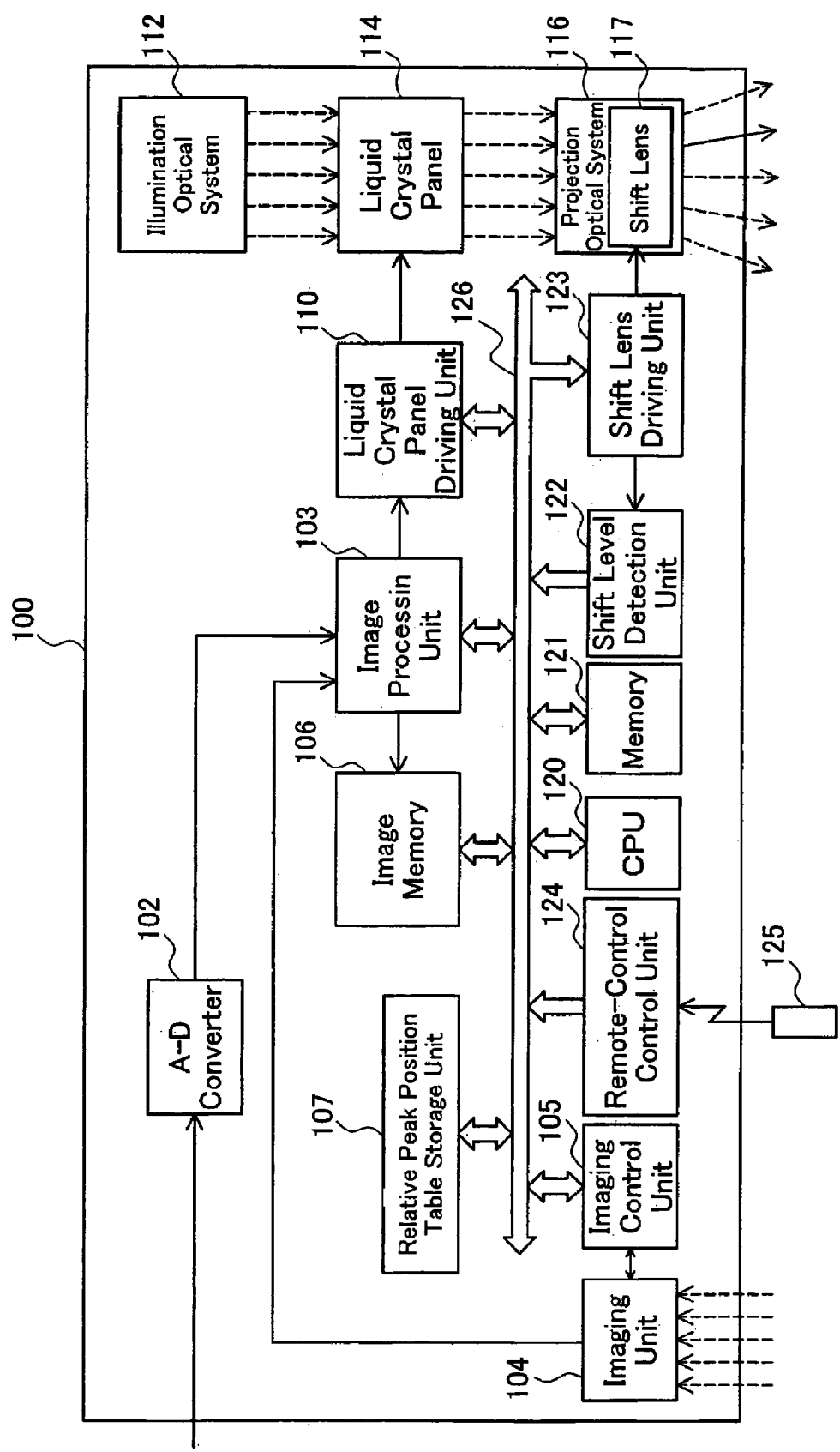
FIG. 1 schematically illustrates the configuration of a projector in one embodiment of the invention.
Figure 5A:
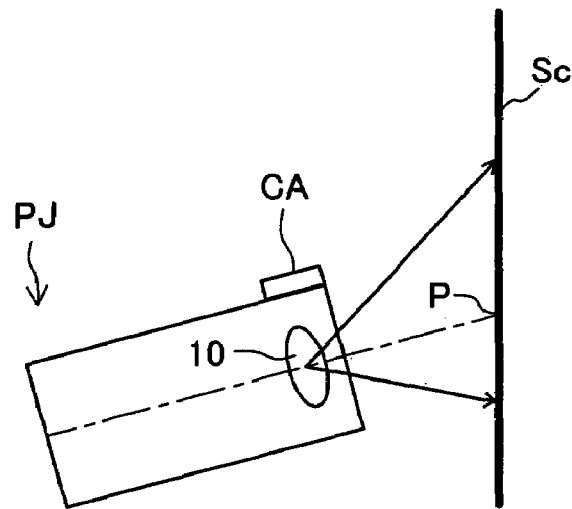
FIGS. 5(A) through 5(C) show a projection state of a conventional projector without a lens shift, a photographed image taken in this projection state, and a luminance distribution of the photographed image.
Figure 5B:
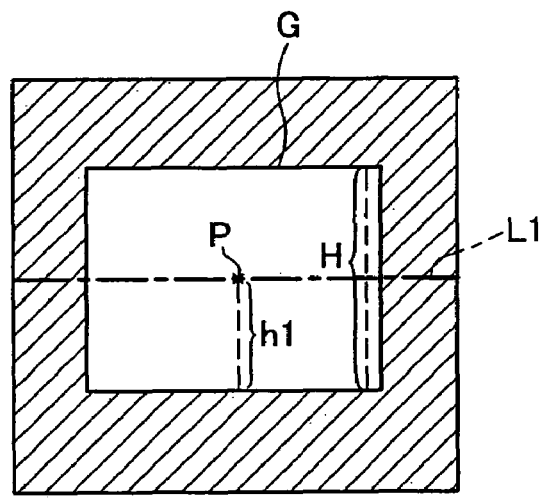
Figure 5C:
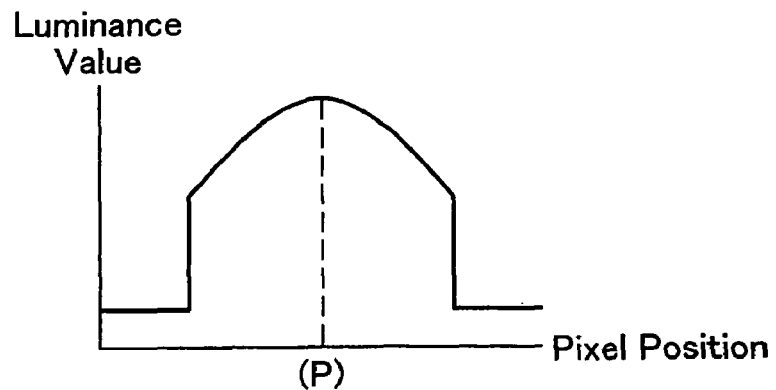

One mode of carrying out the invention is described below as a preferred embodiment in the following sequence:

A. Embodiment
  A1. General Configuration of Projector
  A2. Outline of Image Projection Operations
  A3. Peak Position Reference Line Specification Process and Keystone Correction Process
  A4. Effects of Embodiment
B. Modifications A. Embodiment A1. General Configuration of Projector FIG. 1 schematically illustrates the configuration of a projector 100 in one embodiment of the invention. The projector 100 of this embodiment has the functions of photographing a projected image on a screen, identifying the position of maximum luminance in the photographed image, and making keystone correction, like the conventional projector PJ shown in FIGS. 5 and 6. The projector 100 of the embodiment determine a peak position on a specified horizontal line and accordingly identifies the position of maximum luminance in the photographed image, like the conventional projector PJ.

As illustrated, the projector 100 includes an A-D converter 102, an image processing unit 103, an imaging unit 104, an imaging control unit 105, an image memory 106, a relative peak position table storage unit 107, a liquid crystal panel driving unit 110, a CPU 120, a memory 121, a shift level detection unit 122, a shift lens driving unit 123, a remote-control control unit 124, and a remote control 125.

The projector 100 also has optical elements, that is, an illumination optical system 112 including a lamp and a reflector (not shown), a liquid crystal panel 114, and a projection optical system 116 including a shift lens 117.

The CPU 120 is connected via an internal bus 126 to the image processing unit 103, the imaging control unit 105, the image memory 106, the relative peak position table storage unit 107, the liquid crystal panel driving unit 110, the memory 121, the shift level detection unit 122, the shift lens driving unit 123, and the remote-control control unit 124.

The imaging unit 104 has a CCD camera and is positioned near to the projection optical system 116. The imaging unit 104 photographs an image of a preset fixed area and generates image data of R, G, and B tone values. The imaging control unit 105 controls at least one of the shutter speed, the gain, and the aperture set in the imaging unit 104 to adjust the exposure in image taking.

The shift lens driving unit 123 drives the shift lens 117 to vertically shift up and down in response to the user's instruction entered from the remote control 125. The position of the shift lens 117 is detected and quantified by the shift level detection unit 122. The shift level detection unit 122 includes a variable resistance (not shown) that varies the resistance value synchronously with the drive of the shift lens 117, and an A-D converter (not shown) that converts the varied resistance value of the variable resistance into a digital value. The position of the shift lens 117 is one-to-one mapped to the digitized resistance value (shift encoder value). The shift level detection unit 122 accordingly quantifies the position of the shift lens 117 as the shift encoder value. For convenience of explanation, it is assumed that the shift encoder value is varied in a range of 0 (a shift to a bottommost position), 1, 2, ... 10 (no shift), ... to 18, 19, 20 (a shift to a topmost position).

The relative peak position table storage unit 107 stores a relative peak position table before shipment of the projector 100.

A2. Outline of Image Projection Operations

The standard operations of image projection in the projector 100 are described briefly with reference to FIG. 1.

In response to the user's operation of the remote control 125 to enter an image projection start command, the remote control 125 transfers the user's image projection start command to the remote-control control unit 124 by wireless communication. The remote-control control unit 124 transmits the image projection start command transferred from the remote control 125 to the CPU 120 via the internal bus 126. The CPU 120 controls the image processing unit 103 and the other relevant elements in response to the transmitted image projection start command to project an image.

The A-D converter 102 inputs analog video signals output from any of a video player, a TV set, a DVD player, and a personal computer, converts the input analog video signals into digital video signals, and outputs the digital video signals to the image processing unit 103. One modified structure may exclude the A-D converter 102 and may directly enter digital video signals into the image processing unit 103. The image processing unit 103 adjusts the input digital video signals to desired image display conditions, for example, the contrast, the sharpness, and the image shape, and outputs the adjusted digital video signals to the liquid crystal panel driving unit 110.

The liquid crystal panel driving unit 110 drives the liquid crystal panel 114 in response to the input digital video signals. The liquid crystal panel 114 modulates the illumination light emitted from the illumination optical system 112 according to image information. The projection optical system 116 is attached to a front face of the casing of the projector 100 and projects the illumination light modulated by the liquid crystal panel 114 onto a screen (not shown). This projects an image on the screen.

A3. Peak Position Reference Line Specification Process and Keystone Correction Process When the user positions the projector 100 to be inclined to the screen at a certain elevation angle and powers on the projector 100, the image processing unit 103 (see FIG. 1) generates an all-white image as an adjustment pattern image. The all-white image is projected on the screen according to the image projection operations described above.

The user gives a lens shift instruction for a positional shift of the shift lens 117 through the operation of the remote control 125 (see FIG. 1) to project the adjustment pattern image at a desired position on the screen. The lens shift instruction is transmitted to the CPU 120 via the remote-control control unit 124 and the internal bus 126. The CPU 120 receives the lens shift instruction and controls the shift lens driving unit 123 to shift the position of the shift lens 117.

Figure 6A:
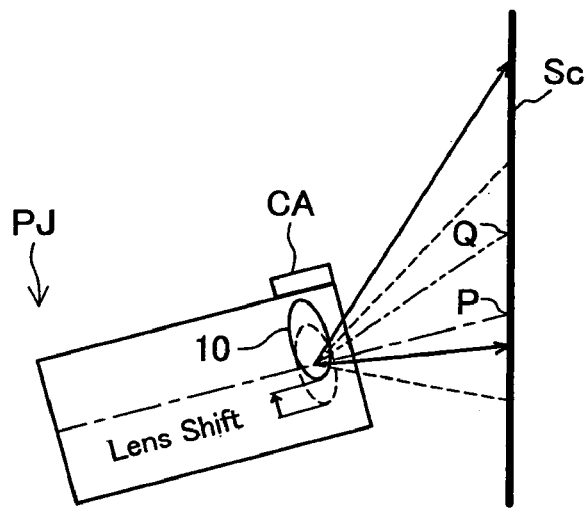
FIGS. 6(A) through 6(C) show a projection state of the conventional projector with a lens shift, a photographed image taken in this projection state, and a luminance distribution of the photographed image.
Figure 6B:
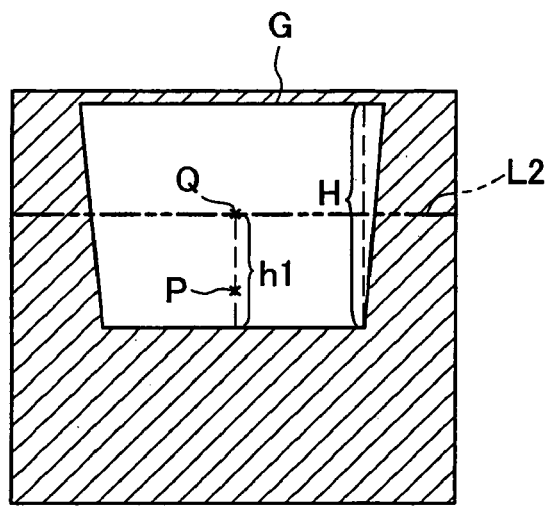
Figure 6C:
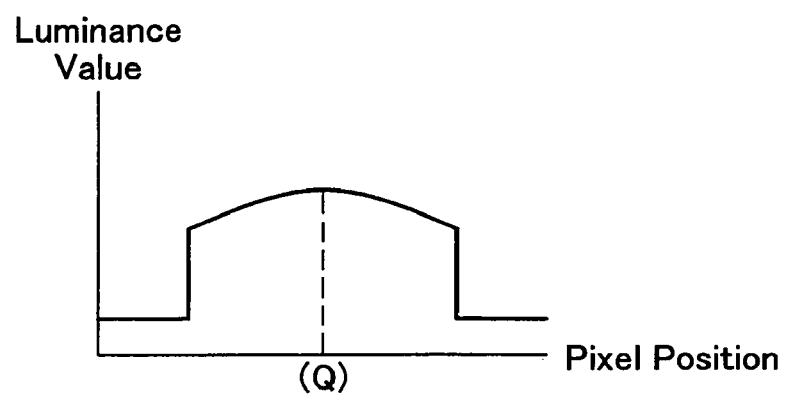

The position and the orientation of the projector 100 and the shift level of the shift lens 117 in this embodiment are assumed to be identical with the position and the orientation of the conventional projector PJ and the shift level of the shift lens 10 shown in FIG. 6(A). In this projection state, the projected adjustment pattern image has a trapezoidal distortion.

The user then manipulates the remote control 125 to enter a keystone correction start command. The keystone correction start command is transmitted to the CPU 120 via the remote-control control unit 124 and the internal bus 126. The CPU 120 reads a program of the peak position reference line specification process from the memory 121 and executes this program prior to the keystone correction. Execution of this program starts the peak position reference line specification process, which is characteristic of the invention.

Figure 2:
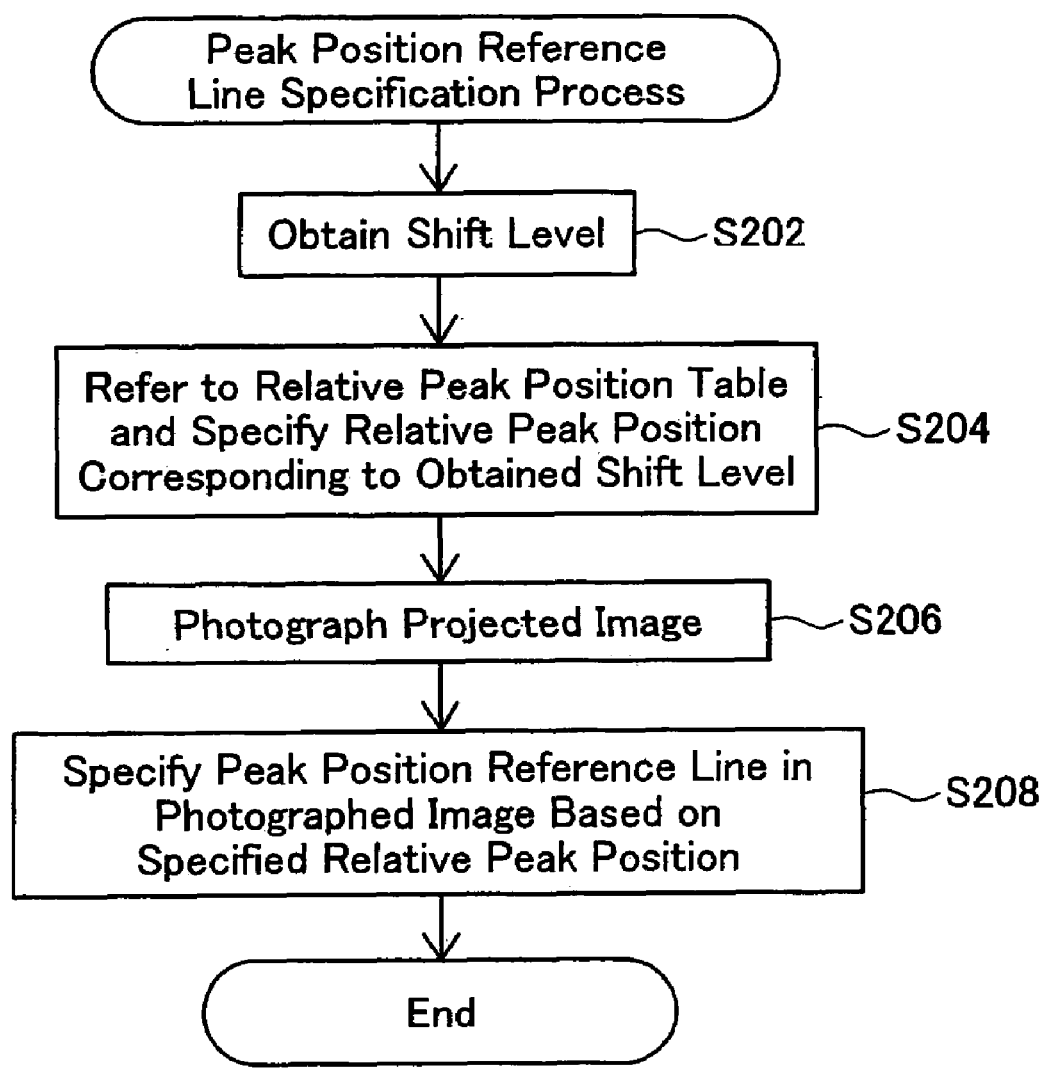
FIG. 2 is a flowchart showing a peak position reference line specification process executed by a CPU included in the projector of the embodiment.

FIG. 2 is a flowchart showing the peak position reference line specification process executed in the projector 100 of the embodiment.

In the peak position reference line specification process of FIG. 2, the CPU 120 first controls the shift level detection unit 122 to obtain the shift level of the shift lens 117 and stores the obtained shift level into the memory 121 (step S202).

As mentioned above, the shift level detection unit 122 detects and quantifies the position of the shift lens 117 as the shift encoder value in the range of 0 to 20. The shift level detection unit 122 then computes the shift level from the shift encoder value according to Equation (1) given below:

$$\text{Shift Level} = (\text{Shift Encoder Value}) \times 10 - 100 \quad (1)$$

The shift level computed from the shift encoder value is obtained as a value in a range of −100 (a shift to the bottommost position), −90, −80, . . . 0 (no shift), . . . to 80, 90, 100 (a shift to the topmost position) and is stored into the memory 121.

In this embodiment, the CPU 120 obtains the shift level '80' in the projection state as shown in FIG. 6(A).

The CPU 120 refers to the relative peak position table stored in the relative peak position table storage unit 107 to specify a relative peak position corresponding to the obtained shift level and stores the specified relative peak position into the memory 121 (step S204).

FIG. 3 shows the relative peak position table stored in the relative peak position table storage unit 107.

As shown in FIG. 3, the relative peak position table stores the relative peak position mapped to the shift level.

The relative peak position is expressed as a ratio (percentage) of the height of the optical axis point to the height of the projected image. For example, the relative peak position '50' represents that the height of the optical axis point is half the height of the projected image.

In the relative peak position table of FIG. 3, the higher relative peak position is set corresponding to the greater shift level, because of the following reason.

While the position of the projected image on the screen is shifted with the variation in shift level of the shift lens 117, the position of the optical axis point on the screen is not changed by the lens shift but is fixed. Namely the lens shift changes the relative position of the optical axis point to the position of the projected image included in the photographed image. The greater shift level causes the greater shift length in position of the projected image and thereby the greater change in relative position of the optical axis point to the position of the projected image.

The projection orientation of the projector 100 is set to locate the optical axis point on a top side of a projected image at the bottommost position of the shift lens 117 and to locate the optical axis point on a bottom side of the projected image at the topmost position of the shift lens 117. The relative peak position table of FIG. 3 accordingly sets the highest relative peak position '100' corresponding to the shift level '−100' representing a shift to the bottommost position and the lowest relative peak position '0' corresponding to the shift level '100' representing a shift to the topmost position.

In the above example, the CPU 120 refers to the relative peak position table and specifies the relative peak position '10' corresponding to the shift level '80'.

The CPU 120 then sends an imaging instruction to the imaging control unit 105. In response to the received imaging instruction, the imaging control unit 105 controls the imaging unit 104 to photograph a projected image. The image processing unit 103 then generates image data of the photographed image and stores the image data into the image memory 106 (step S206).

The CPU 120 reads the image data of the photographed image from the image memory 106 and the specified relative peak position from the memory 121 and specifies a peak position reference line in the photographed image, based on the specified relative peak position (step S208). A concrete procedure of specifying the peak position reference line is discussed below with reference to FIG. 4.

Figure 4A:
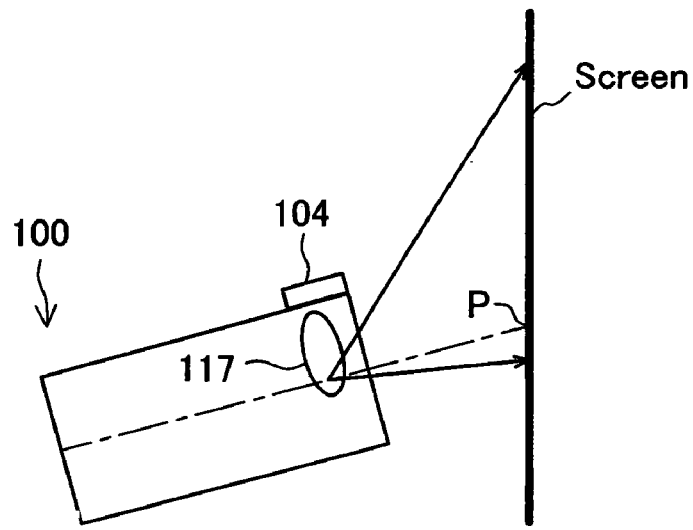
FIGS. 4(A) through 4(C) show a projection state of the projector of the embodiment, a photographed image taken in the projection state, and a luminance distribution of the photographed image.
Figure 4B:
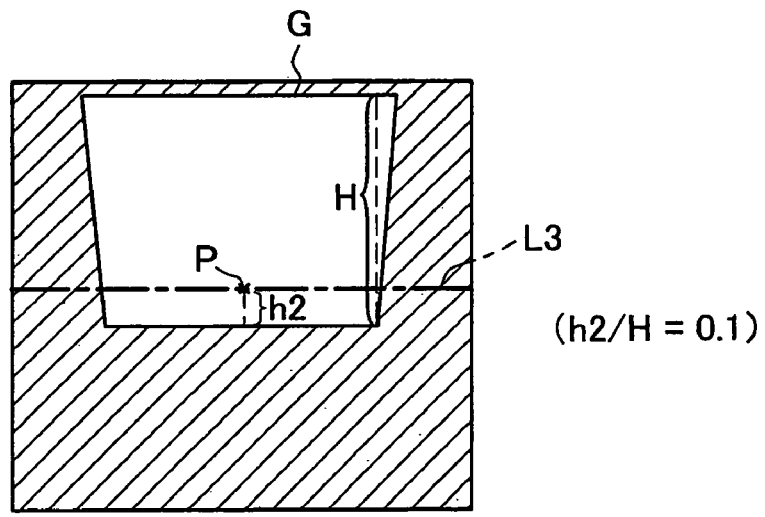
Figure 4C:
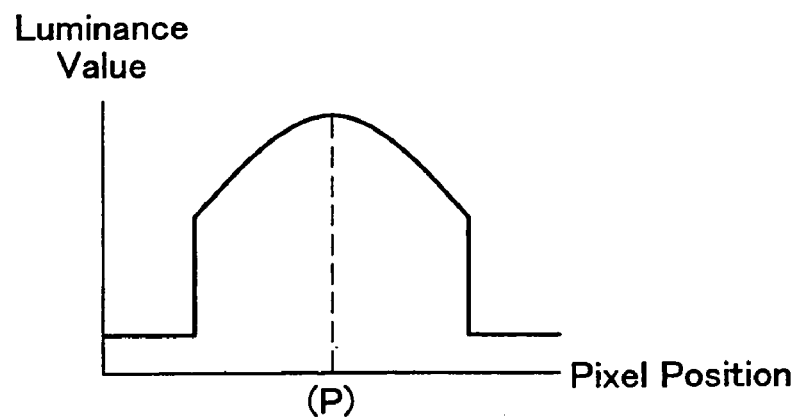

FIGS. 4(A) through 4(C) show a projection state of the projector 100 of the embodiment, a photographed image taken in the projection state, and a luminance distribution of the photographed image.

The side view of FIG. 4(A) shows a certain projection state of the projector 100, FIG. 4(B) shows a photographed image taken in the projection state of FIG. 4(A), and the graph of FIG. 4(C) shows a distribution of luminance values of respective pixels on a specified peak position reference line in the photographed image of FIG. 4(B).

The projection state of the projector 100 shown in FIG. 4(A) is identical with the projection state of the conventional projector PJ shown in FIG. 6(A). The photographed image of FIG. 4(B) taken in the projection state of FIG. 4(A) is accordingly identical with the photographed image of FIG. 6(B).

The CPU 120 reads RGB image data of the photographed image shown in FIG. 4(B) from the image memory 106 and computes luminance values (Y) of respective pixels included in the RGB image data according to a preset computational expression. The CPU 120 then identifies the positions of pixels on a bottom side and a top side of a projected adjustment pattern image G included in the photographed image, based on the computed luminance values.

The concrete procedure first performs binarization to convert the luminance values of the respective pixels included in the image data into binary digits representing white color and black color. The luminance values of the pixels included in the projected adjustment pattern image G are converted into the binary digit representing white color. The procedure selects all the pixels having the binary digit of white color and identifies the positions of the pixels on the bottom side and the top side of the photographed adjustment pattern image G, based on the selected pixels of white color.

The CPU 120 then calculates a height of the projected adjustment pattern image G from the identified positions of the pixels on the bottom side and the top side of the photographed adjustment pattern image G, and computes a height of the specified relative peak position from the calculated height of the projected adjustment pattern image G and the specified relative peak position. The CPU 120 subsequently specifies a horizontal line at the computed height as a peak position reference line and stores the coordinates of the specified peak position reference line in the photographed image into the memory 121.

For example, when the specified relative peak position is equal to '10', the CPU 120 computes a height 'h2' corresponding to 10% of a height H of the projected adjustment pattern image G, and specifies a horizontal line L3 at the computed height 'h2' as the peak position reference line.

The height of the horizontal line L3 represents the height of the relative peak position specified corresponding to the shift level in the relative peak position table. Namely the horizontal line L3 goes through the optical axis point P as shown in FIG. 4(B). The distribution of luminance values of the respective pixels on the horizontal line L3 has a peak at the position of the optical axis point P as shown in FIG. 4(C). The peak in the luminance distribution of FIG. 4(C) is sufficiently steep and has a distinct peak position, unlike the luminance distribution of FIG. 6(C).

After the peak position reference line specification process described above, the CPU 120 reads a program from the memory 121 and executes the program to specify the correction values for keystone correction.

According to this program, the CPU 120 reads the image data of the photographed image from the image memory 106 and the coordinates of the specified peak position reference line in the photographed image from the memory 121. The CPU 120 then computes the luminance values of the respective pixels on the specified peak position reference line from the image data and compares the computed luminance values to identify the position of maximum luminance.

The luminance distribution on the peak position reference line has a distinct peak position as mentioned above. The CPU 120 can thus determine the position of maximum luminance with high accuracy.

The variation in correction values for keystone correction against the position of maximum luminance is set in advance as a map and is stored in the memory 121. The CPU 120 reads the correction values for keystone correction corresponding to the determined position of maximum luminance from the map in the memory 121 and transmits the correction values for keystone correction to the image processing unit 103.

The image processing unit 103 adjusts the adjustment pattern image G and makes the keystone correction with the correction values transmitted from the CPU 120. The image processing unit 103 also adjusts the digital video signals input from the A-D converter 102 and makes the keystone correction with the correction values transmitted from the CPU 120.

The keystone correction preliminarily corrects an object image to a trapezoidal shape to cancel out a trapezoidal distortion of a resulting projected image. The correction values represent the positions of apexes in the corrected image of the trapezoidal shape.

The accurate determination of the position of maximum luminance enables the CPU 120 to specify the optimum correction values and transmit the optimum correction values to the image processing unit 103. The image processing unit 103 can thus make the adequate and accurate keystone correction.

A4. Effects of Embodiment

As described above, the relative peak position table stored in the projector 100 has the relative peak position set corresponding to each shift level. The CPU 120 refers to this relative peak position table and specifies the peak position reference line corresponding to the actual shift level obtained by the shift level detection unit 122. A horizontal line going through the optical axis point is accordingly specified as the peak position reference line. The luminance distribution on the peak position reference line has a distinct peak position. This arrangement of the embodiment thus enables distinct identification of the position of maximum luminance and ensures adequate and accurate keystone correction.

B. Modifications

The embodiment discussed above is to be considered in all aspects as illustrative and not restrictive. There may be many modifications, changes, and alterations without departing from the scope or spirit of the main characteristics of the present invention. Some examples of possible modification are given below.

B1. Modified Example 1

In the structure of the embodiment, the projection orientation of the projector 100 is set to locate the optical axis point on the top side of a projected image at the bottommost position of the shift lens 117. Such projection orientation is, however, not restrictive. The projection orientation of the projector 100 may be set to locate the optical axis point above the top side of the projected image at the bottommost position of the shift lens 117.

In this modified arrangement, the optical axis point moves upward to become out of the projected image at a lower shift limit in the course of a downward shift of the shift lens 117. The relative peak position table accordingly has the relative peak position '100' set corresponding to all the shift levels of and below the lower shift limit that locates the optical axis point on the top side of the projected image. Even when the optical axis point is out of the projected image, a horizontal line that is closer to the optical axis point and corresponds to the top side of the projected image is specified as the peak position reference line.

Similarly the projection orientation of the projector 100 may be set to locate the optical axis point below the bottom side of the projected image at the topmost position of the shift lens 117. In this modified arrangement, the relative peak position table has the relative peak position '0' set to all the shift levels of and over an upper shift limit that locates the optical axis point on the bottom side of the projected image.

B2. Modified Example 2

In the relative peak position table used in the projector 100 of the embodiment, the highest relative peak position '100' is set corresponding to the shift level '−100' representing a shift to the bottommost position. The relative peak position corresponding to the shift level '−100' may be slightly lower than the highest relative peak position '100', for example, '99' or '98'.

Under the condition of the shift level '−100', the projection orientation of the projector 100 is set to locate the optical axis point on the top side of the projected image. The top side of the projected image forms a boundary between the bright projected image area and the dark non-projection area in the photographed image. The detected luminance values of the pixels on the top side of the projected image may be lower than the actual level due to the low luminance values of the adjoining darker area. This may cause difficulty in accurate identification of the position of maximum luminance.

The slight change of the relative peak position causes a horizontal line slightly below the top side of the projected image to be specified as the peak position reference line. This modified arrangement ensures accurate identification of the position of maximum luminance even under the condition of the shift level '−100'.

Similarly the relative peak position corresponding to the shift level '100' representing a shift to the topmost position may be slightly higher than the lowest relative peak position '0', for example, '1' or '2'

B3. Modified Example 3

The procedure of the embodiment specifies only one horizontal line as the peak position reference line. This number of the peak position reference line is, however, not restrictive. The keystone correction or another image processing operation subsequent to the peak position reference line specification process may refer to a preset number of multiple lines. In this case, the horizontal line specified by the procedure of the embodiment as well as horizontal lines below and above the specified horizontal line may be used as the preset number of multiple peak position reference lines.

B4. Modified Example 4

The procedure of the embodiment refers to the relative peak position table to specify the relative peak position. This method is, however, not restrictive. One modified procedure may use a preset computational expression to compute the relative peak position from the shift level as a parameter. The CPU 120 computes the relative peak position from the shift level obtained by the shift level detection unit 122 according to this computation expression.

B5. Modified Example 5

In the projector 100 of the embodiment, the shift encoder value is varied in the range of 0 to 20. The shift encoder value is, however, not restricted to this range but may be varied in another preset range, for example, in a range of 0 to 255. The relative peak position table has the peak relative position set corresponding to each shift level expressed by the shift encoder value in any modified range.

B6. Modified Example 6

The projector 100 of the embodiment identifies the position of maximum luminance on the peak position reference line specified by the peak position reference line specification process and subsequently makes the keystone correction. The image processing operation executed after identification of a peak position is not restricted to the keystone correction but may be another image processing operation to adjust the projected image, for example, the zoom adjustment or the focus adjustment. The technique of the invention is preferably applied to accurately identify a peak position on the specified peak position reference line and performs adequate and accurate image processing operations.

B7. Modified Example 7

In the projector 100 of the embodiment, the shift lens 117 is movable in the vertical direction to shift up and down. The technique of the invention is similarly applicable to a projector having a shift lens movable in the horizontal direction to shift left and right. In the projector with this shift lens, the relative peak position set in the relative peak position table represents a ratio of the width between the right side of a projected image and the optical axis point to the width between the right and left sides of the projected image.

B8. Modified Example 8

The procedure of the embodiment specifies the line going through the optical axis point as the peak position reference line. Such specification is, however, not restrictive. One modified procedure may experimentally or otherwise determine the position of maximum luminance corresponding to each shift level and specify a line going through the determined position of maximum luminance as the peak position reference line. In this modification, the determined position of maximum luminance is set as the relative position to the projected image and is mapped to each shift level in the relative peak position table.

B9. Modified Example 9

The projector 100 of the embodiment uses the all-white image as the adjustment pattern image. This is, however, not essential at all, and the adjustment pattern image may be an image of a preset tone pattern or an image of a selected symbol or a selected logo.

B10. Modified Example 10

The embodiment uses the luminance (Y) to express the brightness of an image. The luminance may be replaced by any of R, G, and B tone values or by an average of R, G, and B tone values.

B11. Modified Example 11

The technique of the invention is not restricted to the liquid crystal projectors like the projector 100 of the embodiment but is also applicable to DLP projectors (registered trademark).

Finally the present application claims the priority based on Japanese Patent Application No. 2005-45682 filed on Feb. 22, 2005, which is herein incorporated by reference.

What is claimed is:

1. A projector that is equipped with a projection lens movable in a direction substantially perpendicular to an optical axis and uses the projection lens to project and display an image on a projection object, the projector comprising:
   an imaging structure that photographs an area including at least the projected image on the projection object to take a photographed image;
   a shift level detection unit that detects a shift level of the projection lens;
   a control module that specifies a reference line to be processed in the photographed image; and
   a storage unit that stores a map of positional information to each shift level, where the positional information represents an expected relative line position to the projected image included in the photographed image,
   wherein the control module specifies a display position of the projected image included in the photographed image,
   the control module controlling the shift level detection unit to detect the shift level, reading the positional information corresponding to the detected shift level from the map stored in the storage unit, and specifying the reference line, based on the expected relative line position represented by the read positional information and the specified display position of the projected image.

2. The projector in accordance with claim 1, wherein the control module identifies a position of maximum brightness on the specified reference line as an image peak position having maximum brightness in the photographed image, the projector further comprising:

an image processing unit that adjusts the projected image, based on the image peak position identified by the control module.

3. The projector in accordance with claim 2, wherein the image processing unit adjusts the projected image on the projection object to correct a distortion of the projected image caused by an inclination of the projector to the projection object.

4. The projector in accordance with claim 1, wherein the expected relative line position represents position of a line passing through an intersection between the optical axis of the projector and the projection object.

5. The projector in accordance with claim 2, wherein the expected relative line position represents position of a line passing through an intersection between the optical axis of the projector and the projection object.

6. A processing line specification method adopted in a projector, which is equipped with an imaging structure and a projection lens movable in a direction substantially perpendicular to an optical axis, uses the projection lens to project and display an image on a projection object, uses the imaging structure to photograph an area including at least the projected image on the projection object to take a photographed image, the processing line specification method specifying a reference line to be processed in the photographed image, the processing line specification method comprising the steps of:
(a) detecting a shift level of the projection lens;
(b) specifying a display position of the projected image included in the photographed image;
(c) obtaining positional information represents an expected relative line position to the projected image included in the photographed image corresponding to the detected shift level from a map of positional information to each shift level; and
(d) specifying the reference line, based on the expected relative line position represented by the obtained positional information corresponding to the detected shift level and the specified display position of the projected image.

\* \* \* \* \*